(12) United States Patent
Zhang et al.

(10) Patent No.: US 12,535,866 B2
(45) Date of Patent: Jan. 27, 2026

(54) METHOD AND APPARATUS FOR PCIE INTERFACE COMPATIBLE WITH USE OF YINSHAN CARD, AND STORAGE MEDIUM

(71) Applicant: SUZHOU METABRAIN INTELLIGENT TECHNOLOGY CO., LTD., Jiangsu (CN)

(72) Inventors: Shiqiang Zhang, Jiangsu (CN); Shengjin Liu, Jiangsu (CN); Yan Li, Jiangsu (CN)

(73) Assignee: SUZHOU METABRAIN INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/878,615

(22) PCT Filed: Jun. 21, 2023

(86) PCT No.: PCT/CN2023/101929
§ 371 (c)(1),
(2) Date: Dec. 23, 2024

(87) PCT Pub. No.: WO2024/082671
PCT Pub. Date: Apr. 25, 2024

(65) Prior Publication Data
US 2025/0271914 A1  Aug. 28, 2025

(30) Foreign Application Priority Data
Oct. 18, 2022 (CN) .......................... 202211270441.4

(51) Int. Cl.
*G06F 1/18* (2006.01)
*G06F 13/40* (2006.01)
*G06F 13/42* (2006.01)

(52) U.S. Cl.
CPC .............. *G06F 1/185* (2013.01); *G06F 1/183* (2013.01); *G06F 13/4068* (2013.01); *G06F 13/4221* (2013.01); *G06F 2213/0026* (2013.01)

(58) Field of Classification Search
CPC ...... G06F 1/183; G06F 1/185; G06F 13/4068; G06F 13/4221; G06F 2213/0026
See application file for complete search history.

(56) References Cited

U.S. PATENT DOCUMENTS 6,261,104 B1 * 7/2001 Leman ................. H01R 12/721
439/752
7,124,326 B1 * 10/2006 Niikawa ............... H04N 17/002
714/48

(Continued)

FOREIGN PATENT DOCUMENTS

CN   104111886 A   10/2014
CN   208969661 U   6/2019

(Continued)

OTHER PUBLICATIONS

Machine translation CN 113177018 A (Year: 2021).*

(Continued)

*Primary Examiner* — Rehana Perveen
(74) *Attorney, Agent, or Firm* — Merchant & Gould P.C.

(57) ABSTRACT

The present disclosure discloses a method and apparatus for a PCIe interface compatible with use of a Yinshan card, a non-transitory storage medium, and a device, and relates to the technical field of PCIe. The method includes: in response to a card being inserted into a specific PCIe slot in a RISER card, reading, by a main processor, a board type signal through the specific PCIe slot, determining whether the inserted card is a Yinshan card or a standard PCIe interface card based on the board type signal, and displaying the type of the card on a BIOS interface based on a determination result; if the inserted card is the Yinshan card, receiving, by (Continued)

a BIOS, a Yinshan card working mode selected by a user, and controlling, by a GPIO port of the main processor, a working mode selection signal of a RISER card slot based on the Yinshan card working mode; and allocating a corresponding PCIe resource to the Yinshan card through the RISER card based on the working mode selection signal. Therefore, a dual-processor server of an Ampere platform supports the standard PCIe interface card and the Yinshan card.

18 Claims, 5 Drawing Sheets

(56) References Cited

U.S. PATENT DOCUMENTS

| | | | | |
|---|---|---|---|---|
| 7,493,437 | B1* | 2/2009 | Jones | G06F 13/385 |
| | | | | 710/301 |
| 10,255,224 | B1* | 4/2019 | Chiu | G06F 13/4022 |
| 11,256,644 | B2* | 2/2022 | Mekad | G06F 13/4022 |
| 2004/0240173 | A1* | 12/2004 | Yi | G06F 1/185 |
| | | | | 361/679.02 |
| 2007/0162632 | A1* | 7/2007 | Ng | G06F 3/14 |
| | | | | 710/15 |
| 2012/0033370 | A1 | 2/2012 | Karl et al. | |
| 2016/0070661 | A1* | 3/2016 | Huang | G06F 13/12 |
| | | | | 710/33 |
| 2020/0394076 | A1 | 12/2020 | Chih-Yu et al. | |
| 2021/0089239 | A1* | 3/2021 | Liguori | H04L 67/1097 |
| 2021/0216484 | A1* | 7/2021 | Kamath | H04L 12/02 |
| 2021/0257761 | A1* | 8/2021 | Chen | H01R 13/62 |
| 2021/0365398 | A1 | 11/2021 | Po-Ying et al. | |

FOREIGN PATENT DOCUMENTS

| | | |
|---|---|---|
| CN | 112181505 A | 1/2021 |
| CN | 112685347 A | 4/2021 |
| CN | 113204384 A | 8/2021 |
| CN | 114003538 A | 2/2022 |
| CN | 114676082 A | 6/2022 |
| CN | 115344520 A | 11/2022 |

OTHER PUBLICATIONS

Machine translation CN 217386265 U (Year: 2022).*
International Search Report issued for International Patent Application No. PCT/CN2023/101929 mailed Sep. 23, 2023 with English translation.
Chinese Search Report received for CN Application No. 2022112704414, Accessed Dec. 17, 2024, 2 pgs (English translation of the Search Report).
Chinese Decision to Grant received for CN Application No. 202211270441.4 on Jan. 9, 2023, 2 pgs.
Chinese Office Action received for CN Application No. 202211270441.4 on Nov. 22, 2022, 10 pgs.
Chinese Office Action received for CN Application No. 202211270441.4 on Dec. 14, 2022, 7 pgs.

* cited by examiner

METHOD AND APPARATUS FOR PCIE INTERFACE COMPATIBLE WITH USE OF YINSHAN CARD, AND STORAGE MEDIUM

CROSS-REFERENCE TO RELATED APPLICATION

The present application is a National Stage Application of PCT International Application No.: PCT/CN2023/101929 filed on Jun. 21, 2023, which claims priority to Chinese Patent Application 202211270441.4, filed in the China National Intellectual Property Administration on Oct. 18, 2022, the disclosure of which is incorporated herein by reference in its entirety.

TECHNICAL FIELD

This application relates to the technical field of PCIe, and in particular to a method and apparatus for a PCIe interface compatible with use of a Yinshan card, and a non-transitory storage medium.

BACKGROUND

An AMPERE®-brand platform, as a brand-new platform, currently has the highest core density in the industry. A server based on an AMPERE®-brand processor provides excellent performance and scalability for various workloads. The AMPERE®-brand platform server also has requirements in configuration and application of a Yinshan card, and especially, how to accommodate the use of the Yinshan card with a standard PCI-express, or peripheral component interconnect express (PCIe) slot has become a design highlight.

Currently, the AMPERE®-brand platform server mainly adopts a dual-path application, and is designed to balance CPU0 and CPU1 resources. PCIe resources of a central processing unit (CPU) expand corresponding functions by connecting a PCIe interface card into an expanded standard PCIe slot. However, the Yinshan card is not a standard PCIe interface card and cannot be directly connected to the standard PCIe slot to achieve corresponding functions, and therefore the design difficulty is increased in supporting the Yinshan card.

The dual-processor server of the AMPERE®-brand platform currently has the standard PCIe slot designed, but the standard PCIe slot does not support the use of the Yinshan card, limiting the functional application of the Yinshan card.

It can be understood that the Yinshan card mentioned in this disclosure is an intelligent network card that can meet the various needs of the cloud. Its interface is a customized interface different from the standard PCIe interface. To enrich the functionality of the AMPERE®-brand platform, it is necessary to implement the configuration of Yinshan cards on the AMPERE®-brand platform, that is, to support Yinshan cards on AMPERE®-brand platform dual servers, especially to achieve PCIe interface compatibility with Yinshan cards.

SUMMARY

In view of this, an objective of this application is to provide a method and apparatus for a PCIe interface compatible with use of a Yinshan card, a non-transitory storage medium.

Based on the above objective, this application provides a method for a PCIe interface compatible with use of a Yinshan card, and the method includes the following steps:

In response to a card being inserted into a specific PCIe slot of a RISER card, a board type signal is read by a main processor through the specific PCIe slot, it is determined whether the inserted card is a Yinshan card or a standard PCIe interface card based on the board type signal, and the type of the card is displayed on a BIOS interface based on a determination result;

in response to the inserted card being the Yinshan card, a Yinshan card working mode selected by a user is received by a BIOS, and a working mode selection signal of a RISER card slot is controlled by a GPIO port of the main processor based on the Yinshan card working mode; and a corresponding PCIe resource is allocated to the Yinshan card through the RISER card based on the working mode selection signal.

In some embodiments, the board type signal is read by the main processor through the specific PCIe slot includes:

the board type signal is read by the main processor through a first specific slot in the specific PCIe slot, and a pin corresponding to the first specific slot is configured with the board type signal.

In some embodiments, whether the inserted card is a Yinshan card or a standard PCIe interface card is determined based on the board type signal includes:

whether the inserted card is the Yinshan card or the standard PCIe interface card is determined based on a level state of the board type signal;

the inserted card is confirmed to be the Yinshan card in response to the board type signal being in a low-level state; or, the inserted card is confirmed to be the standard PCIe interface card in response to the board type signal being in a high-level state.

In some embodiments, the corresponding PCIe resource is allocated to the Yinshan card through the RISER card based on the working mode selection signal includes:

a PCIe switch within the RISER card is controlled to select and access a corresponding signal based on a level state of the working mode selection signal, and the corresponding PCIe resource is allocated to the Yinshan card based on the accessed signal.

In some embodiments, the method further includes:

a first working mode signal of the Yinshan card is provided by a slave processor through a slave processor interface; and in response to the Yinshan card working mode being a first working mode, the accessed signal is identified as the first working mode signal.

In some embodiments, the first working mode signal of the Yinshan card is provided by a slave processor through the slave processor interface includes: the first working mode signal of the Yinshan card is provided by the slave processor through a Slimline interface of the slave processor, and the Slimline interface of the slave processor is in butt joint with the RISER card through a cable.

In some embodiments, the method further includes: the RISER card also includes a Slimline interface, and the Slimline interface of the RISER card is inserted into the Slimline interface of the slave processor, and the Slimline interface of the RISER card is used to provide an upper 8-bit signal of a PCIe x16 slot.

In some embodiments, the method further includes:

a second working mode signal of the Yinshan card is provided by a main processor through the RISER card slot;

in response to the Yinshan card working mode being a second working mode, the accessed signal is identified as the second working mode signal.

In some embodiments, the method further includes:

an essential working signal of the Yinshan card is provided by the main processor through the RISER card slot, and a corresponding PCIe resource is allocated to the Yinshan card based on the essential working signal.

In some embodiments, the working mode selection signal is set at a pin corresponding to a second specific slot of the RISER card slot.

In some embodiments, the RISER card further includes a GENZ gold finger, and the GENZ gold finger is inserted into the second specific slot of the RISER card slot to obtain the working mode selection signal.

In some embodiments, the method further includes:

a corresponding power supply signal is selected for the Yinshan card or the standard PCIe interface card based on the level state of the board type signal.

In some embodiments, the RISER card includes a power supply gold finger which is inserted into the RISER card slot to supply power to the RISER card.

In some embodiments, the method further includes: the board type signal is used to control slot power-on time of the RISER card slot.

In some embodiments, the RISER card further includes a Yinshan card three-in-one connector, corresponding to an NCSI signal, a USB signal, and a UART signal respectively.

In some embodiments, both the main processor and the slave processor use ALTRA®-brand processors of the AMPERE®-brand platform.

In some embodiments, further includes: the RISER card is a functional expansion card or an adapter card inserted into a PCIe interface.

According to another aspect of this application, an apparatus for a PCIe interface compatible with use of a Yinshan card is further provided, and includes:

a RISER card, and the RISER card includes a specific PCIe slot, and the specific PCIe slot is configured to generate a board type signal in response to a card being inserted into the specific PCIe slot;

a RISER card slot, configured to make the RISER card inserted into the RISER card slot; and a main processor, configured to read the board type signal, determine whether the inserted card is a Yinshan card or a standard PCIe interface card based on the board type signal, display the type of the card on a BIOS interface based on a determination result, and receive, by a BIOS, a Yinshan card working mode selected by a user in response to the inserted card being the Yinshan card, and control, by a GPIO port of the main processor, a working mode selection signal of the RISER card slot based on the Yinshan card working mode, and the RISER card is configured to allocate a corresponding PCIe resource to the Yinshan card based on the working mode selection signal.

According to another aspect of this application, a non-transitory storage medium is further provided, and stores computer program instructions. The computer program instructions, when executed by a processor, implement the above method.

According to another aspect of this application, a computer device is further provided, and includes a memory and a processor. The memory stores a computer program. The computer program, when executed by the processor, performs the above method.

BRIEF DESCRIPTION OF THE DRAWINGS

In order to describe technical solutions in embodiments of this application or in the prior art more clearly, accompanying drawings required to be used in descriptions of the embodiments or the prior art will be briefly introduced below, it is apparent that the accompanying drawings described below are only some embodiments of this application, and those of ordinary skill in the art may also obtain other embodiments according to these drawings without creative work.

DETAILED DESCRIPTION OF THE EMBODIMENTS

To have a more clear understanding of objectives, technical solutions, and advantages of this application, the embodiments of this application are further described in detail in conjunction with specific embodiments and with reference to the accompanying drawings below.

It should be noted that all expressions using "first" and "second" in the embodiments of this application are intended to distinguish between two non-identical entities or non-identical parameters with the same name. It can be seen that "first" and "second" are only for the convenience of expression, and should not be understood as a limitation of the embodiments of this application. In addition, the terms "include" and "have", as well as any variations thereof are intended to cover non-exclusive inclusions, such as other steps or units inherent to a process, a method, a system, a product, or a device including a series of steps or units.

Figure 1:
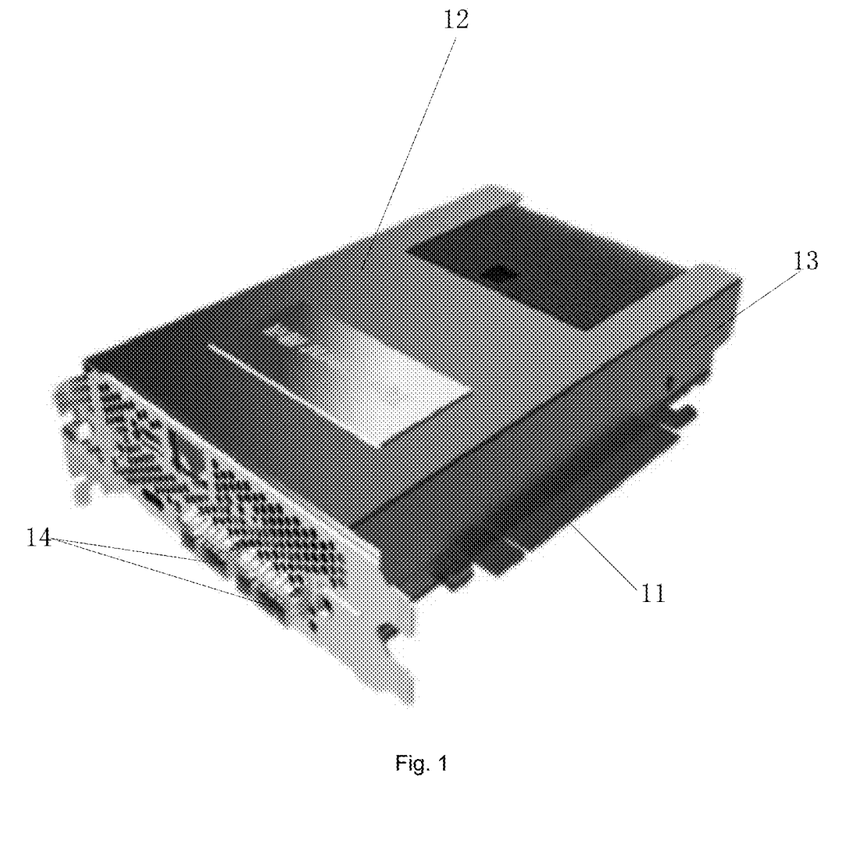
FIG. 1 is a schematic diagram of a Yinshan card according to an embodiment of this application.

For ease of description, some nouns or terms involved in the embodiments of this application are explained below:

Yinshan Card: It's interface is not a standard PCIe interface but a customized interface. It is an intelligent network card developed based on the Intel AGILEX™ FPGA, which can meet the needs of the cloud in terms of function, cost, and performance. Structurally speaking, as shown in FIG. 1, it includes a baseplate 11, a buckle plate 12, a board-to-board high-speed connector 13, and Yinshan card interfaces 14.

The baseplate 11 and the buckle plate 12 are connected together through the board-to-board high-speed connector 13.

Figure 2:
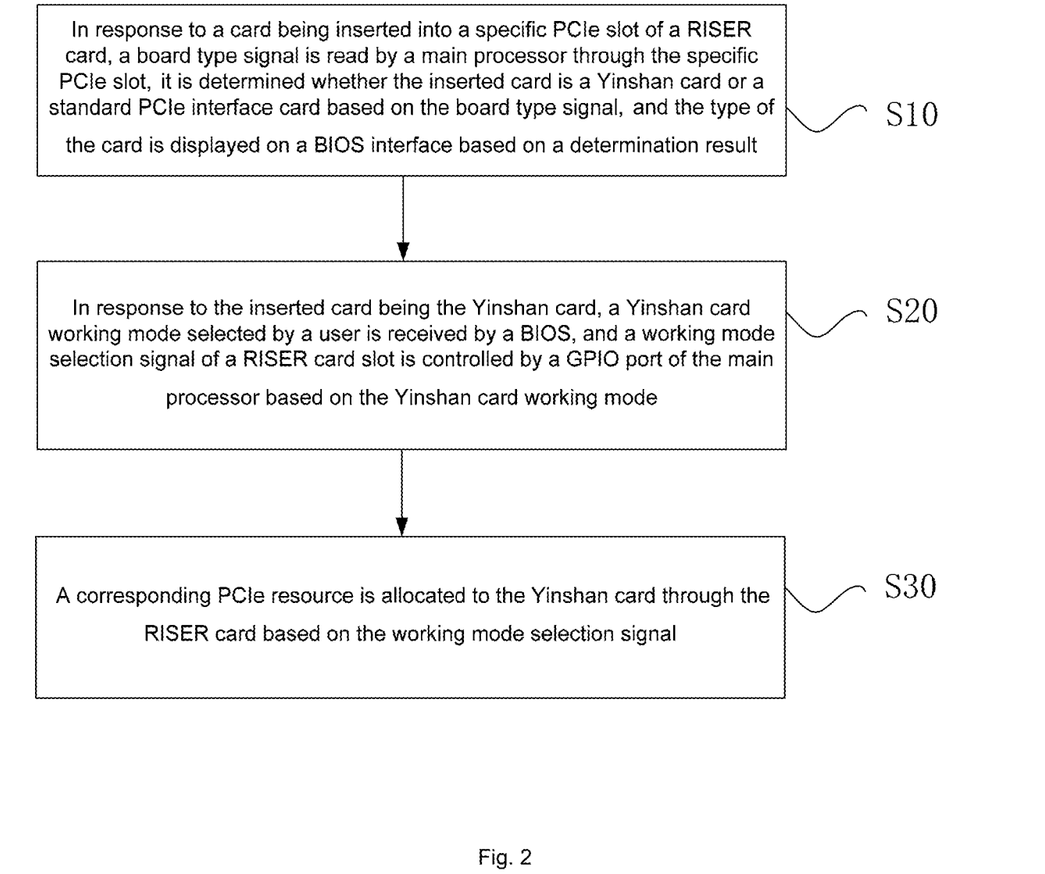
FIG. 2 is a schematic diagram of a method for a PCIe interface compatible with use of a Yinshan card according to an embodiment of this application.

Based on the above objective, according to a first aspect of embodiments of this application, an embodiment of a method for using a PCIe interface compatible with a Yinshan card. FIG. 2 illustrates a schematic diagram of an embodiment of a method for a PCIe interface compatible with use of a Yinshan card according to this application. As shown in FIG. 2, this embodiment of this application includes the following steps:

Step S10: In response to a card being inserted into a specific PCIe slot of a RISER card, a board type signal is read by a main processor through the specific PCIe slot, it is determined whether the inserted card is a Yinshan card or a standard PCIe interface card based on the board type signal, and the type of the card is displayed on a BIOS interface based on a determination result.

Step S20: In response to the inserted card being the Yinshan card, a Yinshan card working mode selected by a user is received by a BIOS, and a working mode selection signal of a RISER card slot is controlled by a GPIO port of the main processor based on the Yinshan card working mode.

Step S30: A corresponding PCIe resource is allocated to the Yinshan card through the RISER card based on the working mode selection signal.

According to the method for a PCIe interface compatible with use of a Yinshan card in this embodiment of this application, by constructing the RISER card slot, designing the RISER card based on the RISER card slot, arranging the specific PCIe slot in the RISER card for insertion of the Yinshan card or the standard PCIe interface card, reading the board type signal at the specific PCIe slot through the main processor, and allocating the PCIe resource required by the corresponding working mode to the Yinshan card based on the working mode selection signal of the RISER card slot when identifying that the inserted card is the Yinshan card, a dual-processor server of an AMPERE®-brand platform supports both the standard PCIe interface card and the Yinshan card, thereby greatly improving practicability of the AMPERE®-brand platform server, and improving product competitiveness.

In some embodiments, the step that the board type signal is read by the main processor through the specific PCIe slot includes: the board type signal is read by the main processor through a first specific slot in the specific PCIe slot, and a pin corresponding to the first specific slot is configured with the board type signal.

In some embodiments, the step that whether the inserted card is the Yinshan card or the standard PCIe interface card is determined based on the board type signal includes: whether the inserted card is the Yinshan card or the standard PCIe interface card is determined based on a level state of the board type signal; the inserted card is confirmed to be the Yinshan card in response to the board type signal being in a low-level state; or, the inserted card is confirmed to be the standard PCIe interface card in response to the board type signal being in a high-level state.

In some embodiments, the step that the corresponding PCIe resource is allocated to the Yinshan card through the RISER card based on the working mode selection signal includes: a PCIe switch within the RISER card is controlled to select and access a corresponding signal based on a level state of the working mode selection signal, and the corresponding PCIe resource is allocated to the Yinshan card based on the accessed signal.

In some embodiments, the method further includes: a first working mode signal of the Yinshan card is provided by a slave processor through a slave processor interface; and in response to the Yinshan card working mode being a first working mode, the accessed signal is identified as the first working mode signal.

In some embodiments, the first working mode signal of the Yinshan card is provided by a slave processor through the slave processor interface includes: the first working mode signal of the Yinshan card is provided by the slave processor through a Slimline interface of the slave processor, and the Slimline interface of the slave processor is in butt joint with the RISER card through a cable.

In some embodiments, the method further includes: the RISER card also includes a Slimline interface, and the Slimline interface of the RISER card is inserted into the Slimline interface of the slave processor, and the Slimline interface of the RISER card is used to provide an upper 8-bit signal of a PCIe x16 slot.

In some embodiments, the method further includes: a second working mode signal of the Yinshan card is provided by a main processor through the RISER card slot; in response to the Yinshan card working mode being a second working mode, the accessed signal is identified as the second working mode signal.

In some embodiments, the method further includes: an essential working signal of the Yinshan card is provided by the main processor through the RISER card slot, and a corresponding PCIe resource is allocated to the Yinshan card based on the essential working signal.

In some embodiments, the working mode selection signal is set at a pin corresponding to a second specific slot of the RISER card slot.

In some embodiments, the RISER card further includes a GENZ gold finger, and the GENZ gold finger is inserted into the second specific slot of the RISER card slot to obtain the working mode selection signal.

In some embodiments, the method further includes: a corresponding power supply signal is selected for the Yinshan card or the standard PCIe interface card based on the level state of the board type signal.

In some embodiments, the RISER card includes a power supply gold finger which is inserted into the RISER card slot to supply power to the RISER card.

In some embodiments, the method further includes: the board type signal is used to control slot power-on time of the RISER card slot.

In some embodiments, the RISER card further includes a Yinshan card three-in-one connector, corresponding to an NCSI signal, a USB signal, and a UART signal respectively.

In some embodiments, both the main processor and the slave processor use ALTRA®-brand processors of the AMPERE®-brand platform.

In some embodiments, further includes: the RISER card is a functional expansion card or an adapter card inserted into a PCIe interface.

The following is a specific embodiment for implementing the method for a PCIe interface compatible with use of a Yinshan card according to this application.

Figure 3:
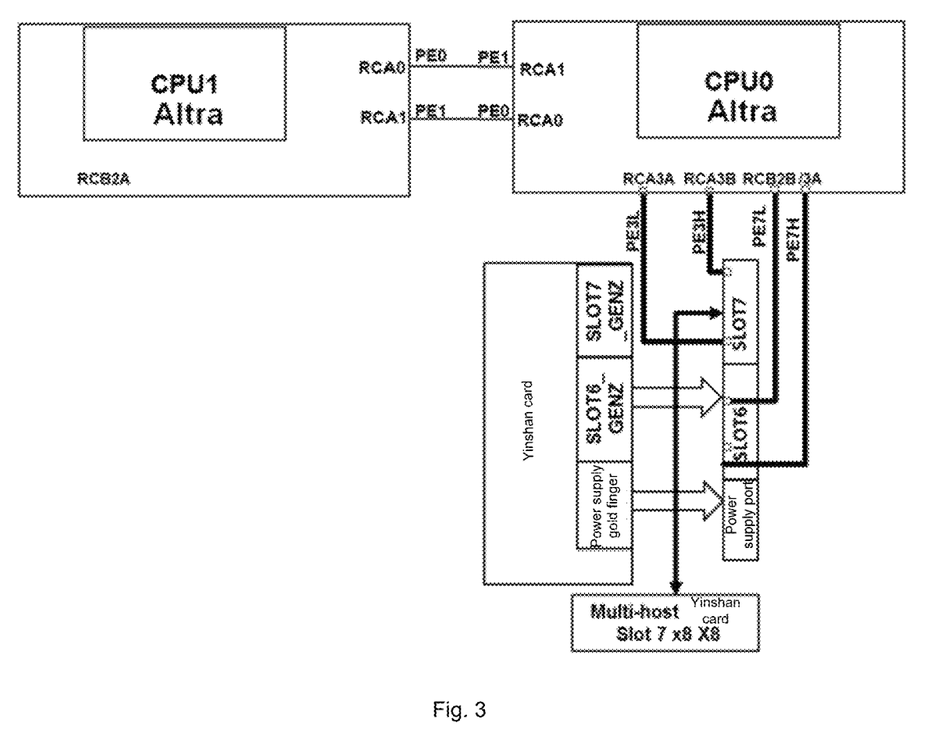
FIG. 3 is a topology diagram of a hardware connection according to an embodiment of this application.
Figure 4:
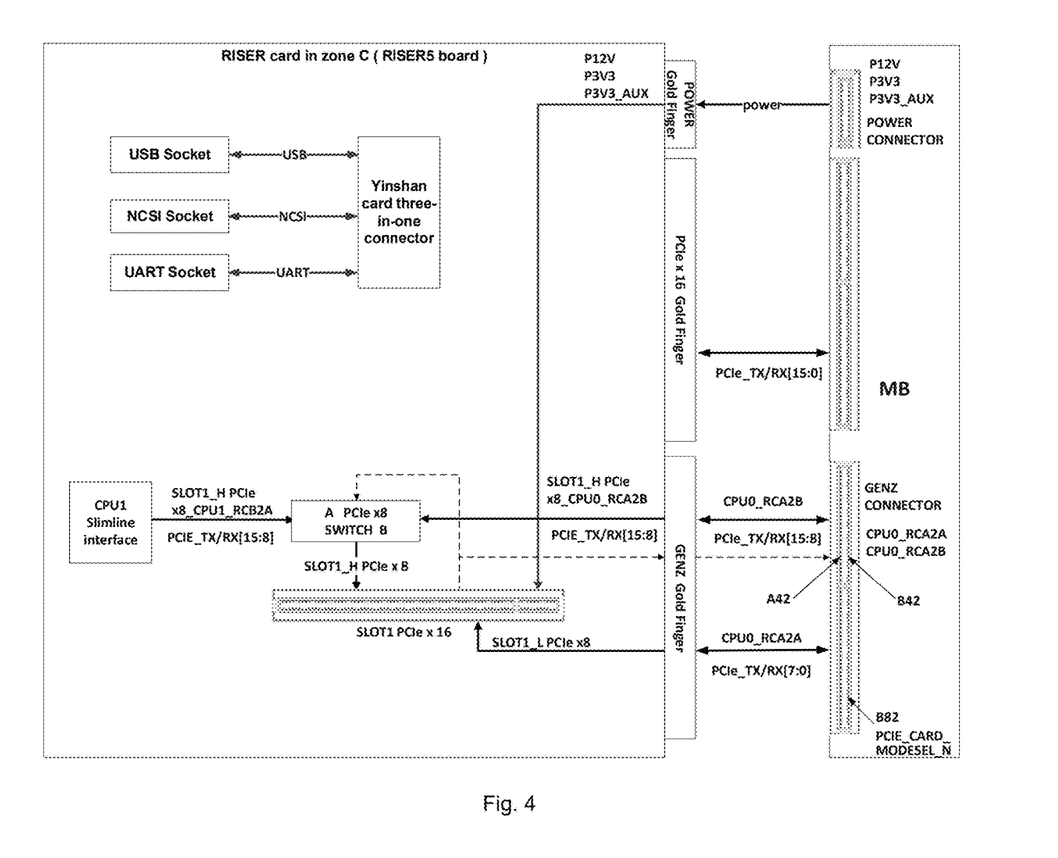
FIG. 4 is a structural schematic diagram of a RISER card and a RISER card slot according to an embodiment of this application.

FIG. 3 is a topology diagram of a hardware connection according to an embodiment of this application. As shown in FIG. 3, this embodiment of this application mainly includes 5 parts: an AMPERE®-brand CPU0 main processor, an AMPERE®-brand CPU1 slave processor, a RISER card slot in a zone C at a motherboard end, a slave processor CPU1 Slimline interface, and a RISER card in the zone C at the motherboard end. The RISER card generally refers to a functional expansion card or an adapter card inserted into an interface of PCI-express, or peripheral component interconnect express (PCIe) which is a high-speed serial computer expansion bus standard. The AMPERE®-brand CPU0 main processor adopts the ALTRA®-brand processor of the AMPERE®-brand platform, which is a core device of the platform. The AMPERE®-brand CPU1 slave processor adopts the ALTRA®-brand processor of the AMPERE®-brand platform FIG. 4 is a structural schematic diagram of a RISER card and a RISER card slot according to an embodiment of this application. As shown in FIG. 4, the AMPERE®-brand main processor CPU0 is connected to the RISER card slot in the zone C, providing PCIe x16 signals RCA2A (an essential working signal) and RCA2B (a second working mode signal) for the RISER card slot in the zone C. RCA2A and RCA2B compose the PCIe x16 signal.

The AMPERE®-brand slave processor CPU1 is connected to the slave processor CPU1 Slimline interface, providing an RCB2A signal (a first working mode signal) required for the slave processor CPU1 Slimline interface. RCB2A is a PCIe x8 signal.

The RISER card slot in the zone C is connected to the AMPERE®-brand CPU0 main processor, and is mainly used for bringing out the RCA2A signal and the RCA2B signal of the AMPERE®-brand CPU0 main processor to the RISER card slot in the zone C of a motherboard, which may ultimately cooperate with the RISER card in the zone C to achieve standard PCIe slot expansion. The RISER card slot in the zone C of the motherboard includes a power supply connector and two GENZ connectors. The power supply connector may support power supply for two standard PCIe x16 slots, and the GENZ connectors may support PCIe x16 signals for two PCIe x16 slots, PCIe slot6 and PCIe slot7. In addition, an A42 point of the RISER card slot in the zone C at the motherboard end is designed with a multihost_sel_n signal (a working mode selection signal). The signal is controlled by a universal input/output interface of CPU0 to be outputted to the RISER card slot in the zone C on the motherboard, and a high level is outputted by default.

The slave processor CPU1 Slimline interface is a standard Slimline interface (a hard drive interface for a portable device), which may provide PCIe x8 signals externally, is connected to the AMPERE®-brand CPU1 slave processor to extract the RCB2A signal of the CPU1, and may be in butt joint with the RISER card in the zone C through a cable, thereby providing a CPU1 PCIe x8 signal CPU1_RCB2A of a Yinshan card multi-host function (a first working mode).

The RISER card in the zone C is a custom-designed RISER card, including 8 parts: a RISER card power supply gold finger, a RISER card GENZ gold finger, a RISER card slimline gold finger, a RISER card PCIe x16 slot (i.e., a specific PCIe slot), a Yinshan card three-in-one socket, a USB socket, an NCSI socket, and a UART socket.

The RISER card power supply gold finger is inserted into the RISER card slot in the zone C at the motherboard end, thereby providing a standard PCIe x16 power supply signal for the RISER card PCIe x16 slot, as well as power required within the RISER card in the zone C.

The RISER card GENZ gold finger is a standard GENZ connector gold finger, and inserted into the RISER card slot in the zone C at the motherboard end, thereby providing a standard PCIe x16 signal for the RISER card PCIe x16 slot. A lower 8-bit signal of the RISER card GENZ gold finger is directly connected to the RISER card PCIe x16 slot, thereby providing the lower 8-bit signal of the PCIe x16 slot. An upper 8-bit signal of the RISER card GENZ gold finger is directly connected to a port B of a PCIe x8 switch within the RISER card in the zone C, thereby providing the upper 8-bit signal of the PCIe x16 slot. An A42 point of the RISER card GENZ gold finger is designed with a multihost_sel_n signal, and controlled by the multihost_sel_n signal at the A42 point (i.e., the second specific slot) of the RISER card slot 3 in the zone C at the motherboard end, thereby controlling the switching of a PCIe x8 switch A/B port signal within a RISER5 board in the zone C.

The RISER card Slimline interface is a slimline connector, which is inserted into the slave processor CPU1 Slimline interface through a cable to provide the RCB2A signal of the CPU1. The RISER card Slimline interface is connected to a port A of the PCIe x8 switch within the RISER card in the zone C, thereby providing the upper 8-bit signal of the PCIe x16 slot of the RISER card.

The RISER card PCIe x16 slot is a standard PCIe x16 slot, which may be in butt joint with a standard PCIe x16 interface card to achieve corresponding functions, or may be in butt joint with the Yinshan card to achieve functions of the Yinshan card.

The Yinshan card three-in-one socket is a 2×10 connector, using the model of a MOLEX connector 5015712007, and is in butt joint with a three-in-one connector of a network connectivity status indicator (NCSI) which is an industrial standard for sideband interface network controllers supporting out-of-band management of servers, a universal serial bus (USB), and a universal asynchronous receiver/transmitter (UART) on the Yinshan card through a cable, thereby introducing a three-in-one signal of the Yinshan card into the RISER card in the zone C.

The USB socket is a standard USB2.0 socket, and may be in butt joint with a USB2.0 socket of a baseboard management controller (BMC) at the motherboard end of the server through a cable.

The NCSI socket is a 2×10 connector, using the model G88020113T4HR from AMPHENOL, and is in butt joint with an NCSI socket at the motherboard end of the server through a cable, thereby achieving NCSI functions of the Yinshan card.

The UART socket is a 3PIN socket, using the model of a MOLEX connector 532530370, and is in butt joint with a UART socket at the motherboard end of the server through a cable, thereby achieving a serial port function of the Yinshan card.

As shown in FIG. 4, which illustrates a structural schematic diagram of a RISER card and a RISER card slot according to an embodiment of this application. The RISER card in the zone C has 3 gold fingers, and a RISER card power supply gold finger and a RISER card GENZ gold finger are directly inserted into a motherboard. The RISER card power supply gold finger supplies power to the RISER card and a RISER card PCIe x16 slot P12V, P3V3, and P3V3_AUX, and the RISER card GENZ gold finger provides standard PCIe x16 signals CPU0_RCA2A and CPU0_RCA2B for the RISER card PCIe x16 slot. Additionally, there is one Slimline interface, and one PCIe slot is expanded within the RISER card. One Slimline interface provides an upper 8-bit signal of the PCIe x16 signal for a SLOT 7. One Yinshan card three-in-one connector interface is in butt joint with a three-in-one connector on the Yinshan card through a cable, and is converted, through signal diversion within the RISER card in the zone C, into one USB interface, one NCSI interface, and one UART interface, thereby facilitating one-to-one butt joint with a USB interface, an NCSI interface, and a UART interface at the motherboard end. The RISER card in the zone C has one PCIe x8 switch, a port A is connected to a slave processor CPU1 Slimline interface, and is used to switch the PCIe x8 signal CPU1_RCB2A to an upper 8-bit of the RISER card PCIe x16 slot.

This embodiment of this application is based on the dual-processor server of a central processing unit (CPU) of the AMPERE®-brand platform. During normal operation, the RISER card in the zone C expands externally to a PCIe slot6 and a PCIe slot7 through insertion of the RISER card power supply gold finger and the RISER card GENZ gold finger into the RISER card slot in the zone C at the motherboard end. The RISER card slimline gold finger on the RISER card in the zone C is inserted into the slave processor CPU1 Slimline interface at the motherboard end through a cable, thereby introducing a PCIe x8 signal CPU1 RCB2A in a multi-host working mode of the Yinshan card. In this embodiment, the PCIe slot6 is a universal PCIe x16 slot, which is not further elaborated. The highlight is the PCIe slot7, namely the RISER card PCIe x16 slot on the RISER card in the zone C, and at the slot, a PCIE_CARD-_MODESEL_N signal (the board type signal) is designed at a pin reserved location B82 (i.e., the first specific slot). When the signal is at a high level, it is determined that the standard PCIe x16 interface card is connected, PCIe slot7 resource allocation is PCIe x16, the P12V power control for the PCIe slot7 is the same with P12V_PCIe, and the level is high by default; and when the signal is at a low level, it is determined that the Yinshan card is connected, PCIe slot7 resource allocation is PCIe x8+x8, and the P12V power control for the PCIe slot7 is the same with P12V AUX.

In addition, the RISER card GENZ gold finger and the A42 point of the RISER card slot in the zone C at the motherboard end are designed with a multihost_sel_n signal to control the PCIe x8 switch. When the signal is at a high level, the CPU0_RCA2B signal at the port B is switched in, and when the signal is at a low level, the CPU1_RCB2A signal at the port A is switched in. The level is high by default. When the signal is at the high level, switching to the CPU0_RCA2B signal at the port B may implement a single-host working mode of the Yinshan card; and when the signal is at the low level, switching to the CPU1_RCB2A signal at the port A may implement a multi-host working mode of the Yinshan card. Therefore, the PCIe slot7 designed in this application may support a PCIe x16 interface card, and also support the PCIe x8+x8 single-host mode (the second working mode) of the Yinshan card or the PCIe x8+x8 multi-host mode (the first working mode) of the Yinshan card. Specific working implementation details are shown as follows in Table 1:

TABLE 1

| PCIE_CARD_MODESEL_N signal level state | multihost_sel_n signal level state | PCIe differential mode | Signal resources | SLOT7 P12V power supply selection | Support mode |
|---|---|---|---|---|---|
| 0 | 0 | x8 + x8 | CPU0_RCA3A + CPU1_RCB2A | P12V_AUX | Yinshan card multi-host |
| 0 | 1 | x8 + x8 | CPU0_RCA3A + CPU0_RCA3B | P12V_AUX | Yinshan card single-host |
| 1 | 0 | invalid | invalid | invalid | invalid |
| 1 | 1 | X16 | CPU0_RCA3A + CPU0_RCA3B | P12V_PCIe | Standard PCIe x16 interface card |

The PCIE_CARD_MODESEL_N signal is provided by the Yinshan card, the CPU0 may read the high or low level state of the signal through the RISER card and a B42 point of the RISER card slot in the zone C to identify the standard PCIe x16 interface card or the Yinshan card, and display the current plug-in card type on a basic input output system (BIOS) setup interface. The multihost_sel_n is controlled by the universal input/output interface port of CPU0. The level state of the signal is manually set through the BIOS setup interface, thereby switching the single-host/multi-host working mode for the Yinshan card. By default, the working mode is the single-host working mode. In addition, the Yinshan card three-in-one interface is in butt joint with the Yinshan card three-in-one socket of the RISER card in the zone C; through USB communication, the function of upgrading Yinshan card FW by a server BMC web is achieved; through NCSI communication, the NCSI function of the Yinshan card is achieved; and through UART communication, the function of monitoring serial port information of the Yinshan card by a BMC Serial Over LAN port is achieved.

The power-on time of the PCIe Slot7 P12V may be controlled based on the PCIE_CARD_MODESEL_N signal, the standard PCIe x16 interface card is supported, and the PCIe x8+x8 single-host mode of the Yinshan card or the PCIe x8+x8 multi-host mode of the Yinshan card is supported as well.

The main feature of this embodiment of this application is the construction of the RISER card slot in the zone C at the motherboard end according to characteristics of the Yinshan card, the RISER card is designed based on the RISER card slot in the zone C at the motherboard end, and the RISER card is provided with the RISER card Slimline interface and the expanded RISER card PCIe x16 slot. Functionally, the PCIe x8 switch is incorporated, and PCIE_CARD_MODE-SEL_N and multihost_sel_n signal detection and P12V power-on control are supported. The PCIe Slot7 is designed to adaptively support the standard PCIe x16 interface card, and support the PCIe x8+x8 single-host mode of the Yinshan card or the PCIe x8+x8 multi-host mode of the Yinshan card as well, thereby facilitating the AMPERE®-brand dual-processor server to support the use of the Yinshan card while supporting the standard interface card.

Figure 5:
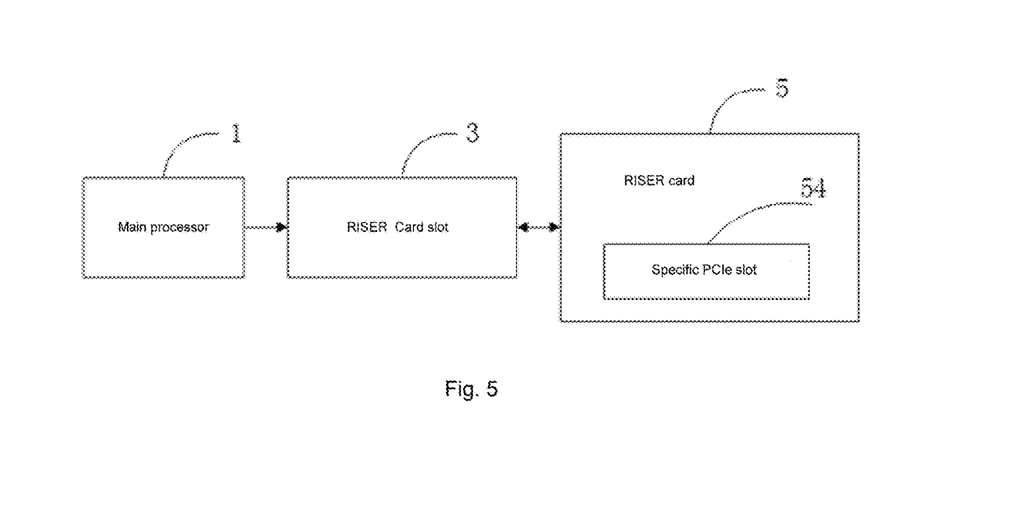
FIG. 5 is a schematic diagram of an apparatus for a PCIe interface compatible with use of a Yinshan card according to an embodiment of this application.

According to a second aspect of the embodiments of this application, an apparatus for a PCIe interface compatible with use of a Yinshan card is further provided. FIG. 5 illustrates a schematic diagram of an embodiment of an apparatus for a PCIe interface compatible with use of a Yinshan card according to this application. As shown in FIG. 5, the apparatus for a PCIe interface compatible with use of a Yinshan card includes a RISER card 5, where the RISER card 5 includes a specific PCIe slot 54, and the specific PCIe slot 54 is configured to generate a board type signal in response to a card being inserted into the specific PCIe slot

54; a RISER card slot 3, configured to make the RISER card 5 inserted into the RISER card slot 3; and a main processor 1, configured to read the board type signal, determine whether the inserted card is a Yinshan card or a standard PCIe interface card based on the board type signal, display the type of the card on a BIOS interface based on a determination result, and receive, by the BIOS, a Yinshan card working mode selected by a user in response to the inserted card being the Yinshan card, and control, by a GPIO port of the main processor 1, a working mode selection signal of the RISER card slot 3 based on the Yinshan card working mode. The RISER card 5 is configured to allocate a corresponding PCIe resource to the Yinshan card based on the working mode selection signal.

In some embodiments, a pin corresponding to a first specific slot in the specific PCIe slot is configured with the board type signal.

In some embodiments, the working mode selection signal is set at a pin corresponding to a second specific slot of the RISER card slot.

In some embodiments, the RISER card includes a power supply gold finger which is inserted into the RISER card slot to supply power to the RISER card.

In some embodiments, the RISER card further includes a Yinshan card three-in-one connector, corresponding to an NCSI signal, a USB signal, and a UART signal respectively.

In some embodiments, both the main processor and the slave processor use ALTRA®-brand processors of an AMPERE®-brand platform.

According to the apparatus for a PCIe interface compatible with use of a Yinshan card in this embodiment of this application, by constructing the RISER card slot, designing the RISER card based on the RISER card slot, arranging the specific PCIe slot in the RISER card for insertion of the Yinshan card or the standard PCIe interface card, reading the board type signal at the specific PCIe slot through the main processor, and allocating the PCIe resource required by the corresponding working mode to the Yinshan card based on the working mode selection signal of the RISER card slot when identifying that the inserted card is the Yinshan card, a dual-processor server of the AMPERE®-brand platform supports both the standard PCIe interface card and the Yinshan card, thereby greatly improving practicability of the AMPERE®-brand platform server, and improving product competitiveness.

Figure 6:
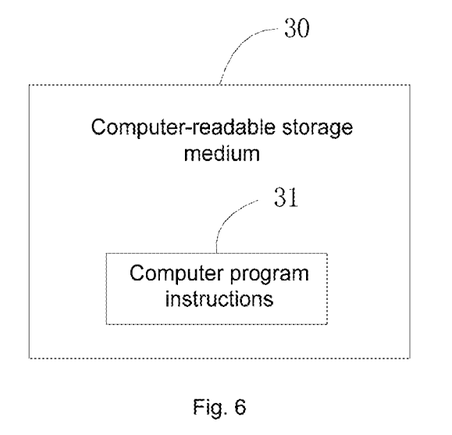
FIG. 6 is a schematic diagram of a non-transitory storage medium for implementing a method for a PCIe interface compatible with use of a Yinshan card according to an embodiment of this application.

According to a third aspect of the embodiments of this application, a non-transitory storage medium is further provided. FIG. 6 illustrates a schematic diagram of a non-transitory storage medium for implementing a method for a PCIe interface compatible with use of a Yinshan card according to an embodiment of this application. As shown in FIG. 6, the non-transitory storage medium 30 stores computer program instructions 31. The computer program instructions 31, when executed by a processor, implement the following steps:

in response to a card being inserted into a specific PCIe slot in a RISER card, a board type signal is read by a main processor through the specific PCIe slot, whether the inserted card is a Yinshan card or a standard PCIe interface card is determined based on the board type signal, and the type of the card is displayed on a BIOS interface based on a determination result;

in response to the inserted card being the Yinshan card, a Yinshan card working mode selected by a user is received by a BIOS, and a working mode selection signal of a RISER card slot is controlled by a GPIO port of the main processor based on the Yinshan card working mode; and a corresponding PCIe resource is allocated to the Yinshan card through the RISER card based on the working mode selection signal.

In some embodiments, the step that a board type signal is read by a main processor through the specific PCIe slot includes: the board type signal is read by the main processor through a first specific slot in the specific PCIe slot, and a pin corresponding to the first specific slot is configured with the board type signal.

In some embodiments, the step that whether the inserted card is a Yinshan card or a standard PCIe interface card is determined based on the board type signal includes: whether the inserted card is the Yinshan card or the standard PCIe interface card is determined based on a level state of the board type signal; the inserted card is confirmed to be the Yinshan card in response to the board type signal being in a low-level state; or, the inserted card is confirmed to be the standard PCIe interface card In some embodiments, the step that the corresponding PCIe resource is allocated to the Yinshan card through the RISER card based on the working mode selection signal includes: a PCIe switch within the RISER card is controlled to select and access a corresponding signal based on a level state of the working mode selection signal, and the corresponding PCIe resource is allocated to the Yinshan card based on the accessed signal.

In some embodiments, the steps further include: a first working mode signal of the Yinshan card is provided by a slave processor through a slave processor interface; and in response to the Yinshan card working mode being a first working mode, the accessed signal is identified as the first working mode signal.

In some embodiments, the steps further include: a second working mode signal of the Yinshan card is provided by a main processor through the RISER card slot; in response to the Yinshan card working mode being a second working mode, the accessed signal is identified as the second working mode signal.

In some embodiments, the steps further include: an essential working signal of the Yinshan card is provided by the main processor through the RISER card slot, and a corresponding PCIe resource is allocated to the Yinshan card based on the essential working signal.

In some embodiments, the working mode selection signal is set at a pin corresponding to a second specific slot of the RISER card slot.

In some embodiments, the steps further include: a corresponding power supply signal is selected for the Yinshan card or the standard PCIe interface card based on the level state of the board type signal.

In some embodiments, the RISER card includes a power supply gold finger which is inserted into the RISER card slot to supply power to the RISER card.

In some embodiments, the RISER card further includes a Yinshan card three-in-one connector, corresponding to an NCSI signal, a USB signal, and a UART signal respectively.

In some embodiments, both the main processor and the slave processor use ALTRA®-brand processors of an AMPERE®-brand platform.

It should be understood that without mutual conflicts, all implementations, features, and advantages elaborated for the method for a PCIe interface compatible with use of a Yinshan card in this application are similarly applicable to the apparatus for a PCIe interface compatible with use of a Yinshan card and the non-transitory storage medium in this application.

Figure 7:
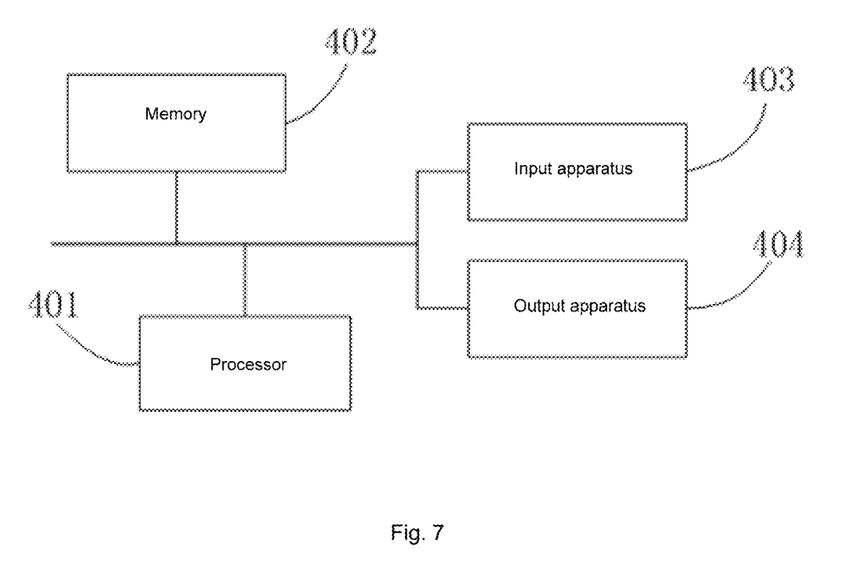
FIG. 7 is a schematic diagram of a hardware structure of a computer device for performing a method for a PCIe interface compatible with use of a Yinshan card according to an embodiment of this application.

According to a fourth aspect of the embodiments of this application, a computer device is further provided, and includes a memory 402 and a processor 401 shown in FIG. 7. The memory 402 stores a computer program. The computer program, when executed by the processor 401, implements the method in any one of the above embodiments.

As shown in FIG. 7, FIG. 7 is a schematic diagram of a hardware structure of an embodiment of a computer device for performing a method for a PCIe interface compatible with use of a Yinshan card according to this application. With the computer device shown in FIG. 7 as an example, the computer device includes one processor 401 and one memory 402, and may also include an input apparatus 403 and an output apparatus 404. The processor 401, the memory 402, the input apparatus 403, and the output apparatus 404 may be connected through a bus or other methods, and bus connection is taken as an example in FIG. 7. The input apparatus 403 may receive inputted digital or character information so as to generate key signal inputs relevant to user settings and function control of the apparatus for a PCIe interface compatible with use of a Yinshan card. The output apparatus 404 may include display devices such as a display screen.

The memory 402, as a non-transitory readable storage medium, may be configured to store non-transitory software programs, non-transitory computer executable programs, and modules, such as the program instructions/modules corresponding to the method for a PCIe interface compatible with use of a Yinshan card in this embodiment of this application. The memory 402 may include a program storage area and a data storage area. The program storage area may store an operating system and an application required by at least one function. The data storage area may store data created based on the use of the method for a PCIe interface compatible with use of a Yinshan card. In addition, the memory 402 may include a high-speed random access memory and may further include a non-transitory memory, such as at least one disk memory device, a flash memory, or other non-transitory solid state memory devices. In some embodiments, the memory 402 optionally includes memories remotely arranged relative to the processor 401, and these remote memories may be connected to a local module through the network. The examples of the above network include, but are not limited to, an Internet, an intranet, a local area network, a mobile communication network, and a combination thereof.

The processor 401 executes various function applications and data processing of the server by operating the non-transitory software programs, the instructions, and the modules stored in the memory 402, thereby implementing the method for a PCIe interface compatible with use of a Yinshan card in the above method embodiments.

It should be finally noted that the non-transitory storage medium (i.e., the memory) herein may be a volatile memory or a non-transitory memory, or may include both the volatile memory and the non-transitory memory. As an example but not a limitation, the non-transitory memory may include a read-only memory (ROM), a programmable ROM (PROM), an electrically programmable ROM (EPROM), an electrically erasable programmable ROM (EEPROM), or a flash memory. The non-transitory memory may include a random access memory (RAM), and the RAM may serve as an external high-speed cache memory. As an example but not a limitation, the RAM may be obtained in many forms such as a synchronous RAM (DRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct Rambus RAM (DRRAM). A storage device in the disclosed aspect includes, but is not limited to, these and other appropriate types of memories.

Those skilled in the art should also understand that various exemplary logical blocks, modules, circuits, and algorithm steps described in conjunction with the disclosure here may be implemented as electronic hardware, computer software, or a combination of both. To clearly describe interchangeability of the hardware and the software, functions of various schematic components, blocks, modules, circuits, and steps are generally described. Whether the functions are implemented as software or hardware depends on a specific application and design constraints imposed on the entire system. Those skilled in the art may implement functions for each specific application in various ways, but such implementation decisions should not be interpreted as causing deviation from the scope disclosed in the embodiments of this application.

The various exemplary logical blocks, modules, and circuits described in conjunction with the disclosure here may be implemented or executed using the following components designed to perform the functions here: a general-purpose processor, a digital signal processor (DSP), an application-specific integrated circuit (ASIC), a field-programmable gate array (FPGA) or other programmable logic devices, a discrete gate or transistor logic, a discrete hardware component, or any combination of these components. The general-purpose processor may be a microprocessor, but alternatively, the processor may be any conventional processor, controller, microcontroller, or state machine. The processor may also be implemented as a combination of computing devices, such as a combination of the DSP and the microprocessor, a plurality of microprocessors, one or more microprocessors combined with the DSP, and/or any other such configuration.

The above contents are exemplary embodiments disclosed in this application, but it should be noted that various changes and modifications may be performed without departing from the scope disclosed in the embodiments of this application defined by the claims. Functions, steps, and/or actions of the method claims of the disclosed embodiments described here do not need to be performed in any specific order. In addition, although elements disclosed in the embodiments of this application may be described or required individually, more elements may also be understood, unless clearly limited as the singular form.

It should be understood that the singular form "one" used herein is also intended to include a plural form, unless the context clearly supports an exception. It should also be understood that "and/or" used herein refers to any and all possible combinations of one or more of items listed in association. The disclosed embodiment serial numbers of the embodiments of this application are for descriptive purposes only and do not represent the superiority or inferiority of the embodiments.

Those of ordinary skill in the art should understand that the discussion about any above embodiment is exemplary and is not intended to imply that the scope (including the claims) disclosed in the embodiments of this application is limited to these examples; and under the idea of the embodiments of this application, technical features in the above embodiments or in different embodiments may also be combined while many other changes of different aspects in the above embodiments of this application exist, and for brevity, are not provided in detail. Therefore, any omission, modification, equivalent substitution, improvement, etc., made within the spirit and principle of the embodiments of this application shall fall within the scope of protection of the embodiments of this application.

What is claimed is:

1. A method for a PCIe interface compatible with use of a Yinshan card, comprising the following steps:
in response to a card being inserted into a specific PCIe slot in a RISER card, reading, by a main processor, a board type signal through the specific PCIe slot, determining whether the inserted card is a Yinshan card or a standard PCIe interface card based on the board type signal, and displaying the type of the card on a BIOS interface based on a determination result, the specific PCIe slot is a PCIe slot in the RISER card;
in response to the inserted card being the Yinshan card, receiving, by a BIOS, a Yinshan card working mode selected by a user, and controlling, by a GPIO port of the main processor, a working mode selection signal of a RISER card slot based on the Yinshan card working mode; and
allocating a corresponding PCIe resource to the Yinshan card through the RISER card based on the working mode selection signal;
wherein allocating the corresponding PCIe resource to the Yinshan card through the RISER card based on the working mode selection signal comprises:
controlling a PCIe switch within the RISER card to select and access a corresponding signal based on a level state of the working mode selection signal, and allocating the corresponding PCIe resource to the Yinshan card based on the accessed signal.

2. The method according to claim 1, wherein reading, by the main processor, the board type signal through the specific PCIe slot comprises:
reading, by the main processor, the board type signal through a first specific slot in the specific PCIe slot, wherein a pin corresponding to the first specific slot is configured with the board type signal.

3. The method according to claim 1, wherein determining whether the inserted card is the Yinshan card or the standard PCIe interface card based on the board type signal comprises:
determining whether the inserted card is the Yinshan card or the standard PCIe interface card based on a level state of the board type signal;
confirming the inserted card being the Yinshan card in response to the board type signal being in a low-level state; or,
confirming the inserted card being the standard PCIe interface card in response to the board type signal being in a high-level state.

4. The method according to claim 1, further comprising:
providing, by a slave processor, a first working mode signal of the Yinshan card through a slave processor interface; and
in response to the Yinshan card working mode being a first working mode, the accessed signal being the first working mode signal.

5. The method according to claim 4, wherein providing, by the slave processor, the first working mode signal of the Yinshan card through the slave processor interface comprises:
providing, by the slave processor, the first working mode signal of the Yinshan card through a Slimline interface of the slave processor, wherein the Slimline interface of the slave processor is in butt joint with the RISER card through a cable.

6. The method according to claim 5, further comprising:
the RISER card further comprising a Slimline interface, wherein the Slimline interface of the RISER card is inserted into the Slimline interface of the slave processor, and the Slimline interface of the RISER card is used to provide an upper 8-bit signal of a PCIe x16 slot.

7. The method according to claim 1, further comprising:
providing, by the main processor, a second working mode signal of the Yinshan card through the RISER card slot; and
in response to the Yinshan card working mode being a second working mode, the accessed signal being the second working mode signal.

8. The method according to claim 1, further comprising:
providing, by the main processor, an essential working signal of the Yinshan card through the RISER card slot, and allocating a corresponding PCIe resource to the Yinshan card based on the essential working signal.

9. The method according to claim 1, wherein the working mode selection signal is set at a pin corresponding to a second specific slot of the RISER card slot.

10. The method according to claim 9, wherein the RISER card further comprises a GENZ gold finger, and the GENZ gold finger is inserted into the second specific slot of the RISER card slot to obtain the working mode selection signal.

11. The method according to claim 1, further comprising:
selecting a corresponding power supply signal for the Yinshan card or the standard PCIe interface card based on the level state of the board type signal.

12. The method according to claim 1, wherein the RISER card comprises a power supply gold finger, and the power supply gold finger is inserted into the RISER card slot to supply power to the RISER card.

13. The method according to claim 11, further comprising: the board type signal being used to control slot power-on time of the RISER card slot.

14. The method according to claim 1, wherein the RISER card further comprises a Yinshan card three-in-one connector, corresponding to Network Controller Sideband Interface (NCSI) signal, a USB signal, and a UART signal respectively.

15. The method according to claim 1, further comprising:
the RISER card being a functional expansion card or an adapter card inserted into a PCIe interface.

16. An apparatus for a PCIe interface compatible with use of a Yinshan card, comprising:
a RISER card, wherein the RISER card comprises a specific PCIe slot, and the specific PCIe slot is configured to generate a board type signal in response to a card being inserted into the specific PCIe slot, the specific PCIe slot is a PCIe slot in the RISER card;
a RISER card slot, wherein the RISER card is configured to insert into the RISER card slot; and
a main processor, configured to read the board type signal, determine whether the inserted card is a Yinshan card or a standard PCIe interface card based on the board type signal, display the type of the card on a BIOS interface based on a determination result, and receive, by a BIOS, a Yinshan card working mode selected by a user in response to the inserted card being the Yinshan card, and control, by a GPIO port of the main processor, a working mode selection signal of the RISER card slot based on the Yinshan card working mode, wherein the RISER card is configured to allocate a corresponding PCIe resource to the Yinshan card based on the working mode selection signal;

the RISER card is further configured to control a PCIe switch within the RISER card to select and access a corresponding signal based on a level state of the working mode selection signal, and allocate the corresponding PCIe resource to the Yinshan card based on the accessed signal.

17. A non-transitory computer readable storage medium, storing computer program instructions, wherein the computer program instructions, when executed by a processor, implement a method for a PCIe interface compatible with use of a Yinshan card, wherein the method comprises:

in response to a card being inserted into a specific PCIe slot in a RISER card, reading, by a main processor, a board type signal through the specific PCIe slot, determining whether the inserted card is a Yinshan card or a standard PCIe interface card based on the board type signal, and displaying the type of the card on a BIOS interface based on a determination result;

in response to the inserted card being the Yinshan card, receiving, by a BIOS, a Yinshan card working mode selected by a user, and controlling, by a GPIO port of the main processor, a working mode selection signal of a RISER card slot based on the Yinshan card working mode; and allocating a corresponding PCIe resource to the Yinshan card through the RISER card based on the working mode selection signal;

wherein allocating the corresponding PCIe resource to the Yinshan card through the RISER card based on the working mode selection signal comprises:

controlling a PCIe switch within the RISER card to select and access a corresponding signal based on a level state of the working mode selection signal, and allocating the corresponding PCIe resource to the Yinshan card based on the accessed signal.

18. The non-transitory computer readable storage medium according to claim 17, wherein reading, by the main processor, the board type signal through the specific PCIe slot comprises:

reading, by the main processor, the board type signal through a first specific slot in the specific PCIe slot, wherein a pin corresponding to the first specific slot is configured with the board type signal.

* * * * *